United States Patent
Peinemann

[11] Patent Number: 6,106,430
[45] Date of Patent: Aug. 22, 2000

[54] ROTARY VIBRATION DAMPING DEVICE FOR DAMPING ROTARY VIBRATIONS IN A DRIVE TRAIN

[75] Inventor: Bernd Peinemann, Niederwerrn, Germany

[73] Assignee: Mannesmann Sachs AG, Schweinfurt, Germany

[21] Appl. No.: 09/019,631

[22] Filed: Feb. 6, 1998

[30] Foreign Application Priority Data

Feb. 6, 1997 [DE] Germany ............ 197 04 517

[51] Int. Cl.$^7$ .................. F16D 3/14; F16F 15/10
[52] U.S. Cl. ............. 475/346; 475/347; 192/30 V; 192/201; 192/212; 74/574; 464/68
[58] Field of Search ............ 74/572, 574; 464/64, 464/68; 192/30 V, 201, 211, 212, 55.61; 475/346, 347

[56] References Cited

U.S. PATENT DOCUMENTS

| | | | |
|---|---|---|---|
| 4,624,351 | 11/1986 | Lutz et al. | 192/201 X |
| 4,638,684 | 1/1987 | Maucher | 74/574 |
| 4,739,866 | 4/1988 | Reik et al. | 192/201 X |
| 4,748,868 | 6/1988 | Kobayashi et al. | 74/574 |
| 4,751,993 | 6/1988 | Fukushima | 74/574 X |
| 4,796,740 | 1/1989 | Fukushima | 192/30 V |
| 4,813,295 | 3/1989 | Drexl et al. | 74/572 |
| 4,828,533 | 5/1989 | Focqueur et al. | 74/574 X |
| 4,842,116 | 6/1989 | Fukushima | 74/574 X |
| 5,209,139 | 5/1993 | Janiszewski | 74/572 X |
| 5,499,703 | 3/1996 | Kii et al. | 192/30 V X |
| 5,553,514 | 9/1996 | Walkowe . | |
| 5,680,918 | 10/1997 | Reik et al. | 74/574 X |
| 5,720,475 | 2/1998 | Duclos | 192/201 X |
| 5,823,880 | 10/1998 | Kajitani et al. | 192/212 X |
| 5,884,740 | 3/1999 | Sudau et al. | 192/70.17 |
| 5,927,452 | 7/1999 | Freise et al. | 74/574 X |

FOREIGN PATENT DOCUMENTS

| | | |
|---|---|---|
| 36 43 272 | 6/1988 | Germany . |
| 38 34 284 | 4/1990 | Germany . |
| 195 17 605 | 11/1995 | Germany . |
| 2 290 597 | 1/1996 | United Kingdom . |

*Primary Examiner*—Charles A. Marmor
*Assistant Examiner*—Scott Lund
*Attorney, Agent, or Firm*—Cohen, Pontani, Lieberman & Pavane

[57] ABSTRACT

A rotary vibration damping device for damping rotary vibrations in a drive train through which the output torque of an internal combustion engine is transmitted in a drive power flow direction to driving wheels ot a motor vehicle. The damping device includes a first inertial mass arrangement that is connected to a crank shaft of the internal combustion engine for the purpose of rotation around a rotational axis, a second inertial mass arrangement that is connected via a spring device to the first inertial mass arrangement for common rotation around the rotational axis and for relative rotation with respect to the first inertial mass arrangement, and at least a third inertial mass arrangement that is connected to the drive train before the spring device in the drive power flow direction for rotation around the rotational axis. The third inertial mass arrangement can be disconnected from the drive train, with respect to rotary drive, when a predetermined operating state is attained.

27 Claims, 4 Drawing Sheets

ROTARY VIBRATION DAMPING DEVICE FOR DAMPING ROTARY VIBRATIONS IN A DRIVE TRAIN

BACKGROUND OF THE INVENTION

1. Field of the Invention

The present invention relates to a rotary vibration damping device for damping rotary vibrations in a drive train through which the output torque of an internal combustion engine is transmitted in a drive power flow direction to the driving wheels of a motor vehicle.

2. Discussion of the Prior Art

A rotary vibration damping device of this type is known from the German reference DE 195 17 605 A1. Rotary vibration damping devices are responsible for reducing or completely suppressing rotational irregularities that occur in the drive train during the operation of a motor vehicle. Such rotational irregularities arise due to the out-of-round running of internal combustion engines, for example, and are transmitted to the entire drive train, causing potential discomfort to the vehicle driver or passengers. In the rotary vibration damping device known from DE 195 17 605 A1, a first centrifugal mass arrangement in the form of the input part of a torsional vibration damper is connected in rotation-proof fashion to the crank shaft. The output part of the torsional vibration damper, which constitutes the second centrifugal mass arrangement and, at the same time, the flywheel for a friction clutch, is connected to the torsional damper input part by torsional damping springs, and thus can be rotated relative to the torsional damper input part as well as with the torsional damper input part around the rotational axis. Further., a third centrifugal mass arrangement is mounted in rotatable fashion on the crank shaft. The third centrifugal mass arrangement is also connected to the torsional vibration damper input part, i.e., to the first centrifugal mass arrangement, via a planetary gearset. A planetary carrier is held in rotation-proof fashion on a fixed housing part. The torsional vibration damper input part is a ring gear, and a sun gear is arranged on the third centrifugal mass arrangement. By means of the planetary gearset, the number of rotations of the crank shaft is transmitted to the third centrifugal mass arrangement in increased fashion and reversed rotational sense.

Due to the relatively high mass inertia moments created by rotary vibration damping devices of this type, such devices have the disadvantage that the internal combustion engine responds relatively poorly to speed changes intended by the driver, especially in the range of higher speeds, because the additional mass must be accelerated or slowed down.

From German reference DE 36 43 272 A1, a rotary vibration damping device is known, in which an additional damping mass is connected in rotary drive fashion to a clutch output shaft, i.e., to a transmission input shaft. In the case of this known rotary vibration damping device, a torsional vibration damper is provided in the drive train in a clutch disk. In the torsional vibration damper, two parts that are mounted one atop the other via springs can be rotated relative to each other for the purpose of vibration damping. In other words, in this known device, the additional damping mass is located in the drive train after the spring device of the torsional vibration damper in the driving force flow direction, and thus substantially impairs the vibrational behavior of the section of the drive train that follows the torsional vibration damper. The aforementioned document also discloses the disconnection of the additional damping mass from the transmission input shaft when a certain speed is exceeded, for the purpose of relieving the friction surfaces that are created by the clutch between the additional damping mass and the transmission input shaft during shifts in gear and transmission synchronization. After such disconnection of the additional damping mass from the transmission input shaft and upon a slight further increase in speed, this known rotary vibration damping device calls for the connection of the additional damping mass to the flywheel, which is linked in rotation-proof fashion to the crank shaft of the internal combustion machine, so as not to impair personal comfort. Thus, in this known device, there is a narrow speed window, below which the additional damping mass is connected to the transmission input shaft and above which the additional damping mass is connected to the flywheel, i.e. is connected to the drive train before the spring device of the torsion vibration damper in the drive power flow direction.

SUMMARY OF THE INVENTION

The object of the present invention is to provide a rotary vibration damping device for damping rotary vibrations in a drive train, which damping device has a good damping characteristic for the rotary vibrations arising in the drive train and also prevents excessive impairment of the output capacity of an internal combustion engine.

According to the invention, this object is attained by a rotary vibration damping device for damping rotary vibrations in a drive train through which the output torque of an internal combustion engine is transmitted in a drive power flow direction to the driving wheels of a motor vehicle. The damping device has a first centrifugal mass arrangement that is connected to a crank shaft of the internal combustion engine for rotation around a rotational axis. A second centrifugal mass arrangement is connected via a spring device to the first centrifugal mass arrangement for common rotation around the rotational axis and for rotation relative to the first centrifugal mass arrangement. At least a third centrifugal mass arrangement is connected to the drive train before the spring device in the drive power flow direction for rotation around the rotational axis.

Further, in the rotary vibration damping device according to the invention, the third centrifugal mass arrangement can be disconnected from the drive train, with respect to rotary drive, when a predetermined operating state is reached.

The rotary vibration damping device according to the invention allows a damping characteristic to be achieved that is adjusted to particular operating states and can thus act as effectively as possible. Furthermore, the change in damping characteristic dependent on operating state is effective on the side of the drive train directly connected to the crank shaft of the internal combustion engine. This ensures, specifically, that the torque fluctuations arising in the internal combustion engine are damped to a great extent.

The predetermined operating state can be, for example:
a predetermined speed level, and/or
a predetermined relative rotational state between the first and second centrifugal mass arrangements, and/or
a predetermined speed change state, and/or
a predetermined engine coolant temperature, and/or
a predetermined choke opening rate level.

For example, once a predetermined state of high speed is attained, torque fluctuations are no longer expected to occur in the internal combustion engine. In this high speed range, the additional damping mass is not necessary. According to the invention, it is therefore disconnected, so that the acceleration or delay behavior of the internal combustion engine is no longer impaired. In the speed range below the predetermined speed level, the additional centrifugal mass is connected, and thus helps to damp rotary vibrations by means of the increased mass moment of inertia that then exists.

In the rotary vibration damping device according to the invention, the additional centrifugal mass arrangement is arranged before the spring device in the direction of drive power flow. For this reason, the additional centrifugal mass arrangement can damp, in an undamped manner, the vibrations produced, specifically, in the internal combustion engine, and can thus contribute to vibration damping to the greatest possible extent. Moreover, various other operating states can be used to initiate the disconnection or connection of the third centrifugal mass arrangement. For example, a relative rotational state between the first and the second centrifugal mass arrangements can be used. In this case, the relatively strong torque fluctuations that occur in the lower speed range and result in large relative rotation between the first and the second centrifugal mass arrangements can be damped by connecting the third centrifugal mass arrangement. Then, when there is only slight relative rotation between the first and second centrifugal mass arrangements, indicating that strong torque fluctuations no longer exist, the third centrifugal mass can be disconnected. It is also possible, by detecting a change in the degree of the choke opening, to detect the intention of the vehicle driver to accelerate. When the driver's wish to accelerate is recognized, it is possible to disconnect the third centrifugal mass arrangement even before the engine speed changes, so that the third centrifugal mass arrangement does not have to be accelerated. This allows the fastest possible speed change to be attained. Furthermore, the engine coolant temperature can be used to identify a predetermined operating state. The attainment of a predetermined coolant temperature indicates that the engine has warmed up, in which state stronger torque fluctuations will not be expected to occur.

With respect to the structure of the rotary vibration damping device according to the invention, it is possible, in an especially advantageous embodiment, for the third centrifugal mass arrangement to be connected to the first centrifugal mass arrangement for rotation around the rotational axis, and also to be disconnected therefrom.

The third centrifugal mass arrangement is preferably connected and disconnected as a function of speed by means of connection means that can be switched between a connecting position and a disconnecting position. The connection means can be switched between the connecting position and the disconnecting position depending on the operating state of the engine, especially speed.

Advantageously, the connection means comprise at least one connection element that is radially movable relative to the rotational axis and is biased into its connecting position. For example, at least one connection element can be run on the first centrifugal mass arrangement in a radially movable fashion and can encompass a connection region, which can be brought into connective engagement with the third centrifugal mass arrangement.

To achieve a relatively gentle connecting and disconnecting process, the connection region encompasses a friction surface area that acts, when in the connecting position, upon a complementary friction surface region on the third centrifugal mass arrangement.

It is also possible, alternatively, for the connection region to encompass a connection projection region or a connection recess region that, when in the connection position, engages in positive-locking fashion in the circumferential direction with a complementary recess or projection region of the third centrifugal mass arrangement. This embodiment of the connection between the third centrifugal mass arrangement and the first centrifugal mass arrangement ensures an especially secure connection, so that even in the event of spontaneous torque fluctuations, slip between the first and the third centrifugal mass arrangements can be prevented.

According to still another embodiment of the invention, the connection element can be a centrifugal force weight element, which is biased radially inward into its connecting position. In this case, the speed of the drive train itself ensures that, when a certain speed is exceeded, the centrifugal force will be great enough to move the biased connection element radially outward and thus release the connection.

Alternatively or in addition to this, however, it is possible for further connection element switching means to be provided to control the movement of the connection element between the connecting position and the disconnecting position. In such an embodiment, operational state detection means are provided to activate the connection element switching means in dependence on the detected operating state.

The operating state detection means can include:
speed detection means, and/or
rotation acceleration detection means, and/or
connection element movement detection means for detecting movement of the connection element, and/or
relative rotation detection means for detecting relative rotation between the first and the second centrifugal mass arrangements, and/or
engine coolant temperature detection means, and/or
change in choke opening rate detection means.

By controlling the movement of the connection element as a function of speed, for example, it is possible, thanks to the centrifugal force activation, to compensate for or avoid possible fluctuations in the movement of the connection element. It is thus possible to obtain defined switching between the connecting position and the disconnecting position. In particular, the provision of switching hysteresis should be considered in an embodiment of this type, so that torque fluctuations near the predetermined speed level do not result in excessively frequent connection or disconnection processes.

Advantageously, the connection element switching means move the connection element by means of electrostatic or electromagnetic alternating action, or the like.

The connection element can be biased into its connecting position in an especially simple manner when the bias is produced by a spring.

To increase the connection strength between the first and the third centrifugal mass arrangements, on the one hand, and to obtain symmetrical mass distribution around the rotational axis and thus avoid imbalance, on the other, a plurality of connection elements are arranged in the circumferential direction at a substantially regular distance from each other. The multiple connection elements are biased into their respective connection positions by tension springs. For the purpose of biasing the connection elements radially inward, the tension springs act in an approximately circumferential direction on the respective connection elements, which are located immediately adjacent to each other in the circumferential direction.

It is thereby possible for each connection element to comprise a connection ring segment with a maximum circumferential extension of 180°, preferably 170°.

To allow the third centrifugal mass arrangement to also be used as a vibration suppressor in the rotary vibration damping device according to the invention, the third centrifugal mass arrangement comprises a first centrifugal mass part, which can be connected to and disconnected from the first centrifugal mass arrangement, and a second centrifugal mass part, which is connected to the first centrifugal mass part with intermediate arrangement of vibration damping means. The vibration damping means is an elastically deformable damping material, for example, a plastic damping ring. In other words, when the third centrifugal mass arrangement is connected to the drive train for the purpose of rotation, the first and second damping parts, which are connected to each other by elastically deformable damping material, act as damping absorbers. The energy needed for the elastic deformation of the damping materials is at least partially dissipated as heat and thus is not fed back into the drive train.

An especially compact embodiment of the rotary vibration damping device according to the invention can be obtained when the third centrifugal mass arrangement is substantially accommodated in an annular cavity in the first centrifugal mass arrangement.

When a speed translation gear is arranged in the power transmission path between the crank shaft and the first centrifugal mass arrangement and/or the third centrifugal mass arrangement for the purpose of translating the speed of the first centrifugal mass arrangement and/or the third centrifugal mass arrangement relative to the crank shaft, it is possible to increase the effective mass inertia of the third centrifugal mass arrangement by means of the translatory effect. As a result, it is then possible, first of all, to maintain the same damping effect while providing a lower-weight third centrifugal mass arrangement, or, secondly, to obtain a markedly greater damping effect by retaining a third centrifugal mass arrangement of the same mass. In the rotary vibration damping device according to the invention, the speed translation gear preferably increases not only the speed of the third centrifugal mass arrangement, but also the speed of the first and second centrifugal mass arrangements. A significantly increased damping effect is thus attained by these first and second centrifugal mass arrangements.

Due to its relatively simple structure and regular distribution of mass, it is advantageous for the speed translation gear to comprise a planetary gearset. The planetary gearset can comprise a planetary gear carrier, which is connected in a rotation-proof manner to the crank shaft and carries the following: at least one planetary gear that can be rotated around an axis substantially parallel to the rotational axis, a ring gear that is not rotatable around the rotational axis and intermeshes radially outside with the planetary gear, and a sun gear that is connected in rotation-proof fashion to the first centrifugal mass arrangement and intermeshes radially inside with the planetary gear. An especially compact and stable arrangement can be achieved when the sun gear is mounted in rotatable fashion on the crank shaft or on a component fixedly connected to the crank shaft. It is also possible for the third centrifugal mass arrangement to be rotatably mounted on a radially outer circumferential surface of the ring gear.

Alternatively, the planetary gearset can comprise:
 a planetary gear carrier that is connectable in a rotation-proof fashion to the crank shaft and carries at least one planetary gear, which can be rotated around an axis substantially parallel to the rotational axis;
 a sun gear that is not rotatable around the rotational axis and intermeshes with the planetary gear radially inside; and a ring gear that is connected in a rotation-proof fashion to the third centrifugal mass arrangement, or is integrally embodied therewith, and intermeshes radially outside with the planetary gear.

The speed level that is used to activate the switching process to connect or disconnect the third centrifugal mass arrangement can be a predetermined speed or a predetermined speed range of the crank shaft, the first centrifugal mass arrangement, the second centrifugal mass arrangement, a transmission input shaft and/or another component rotatable with the drive train.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
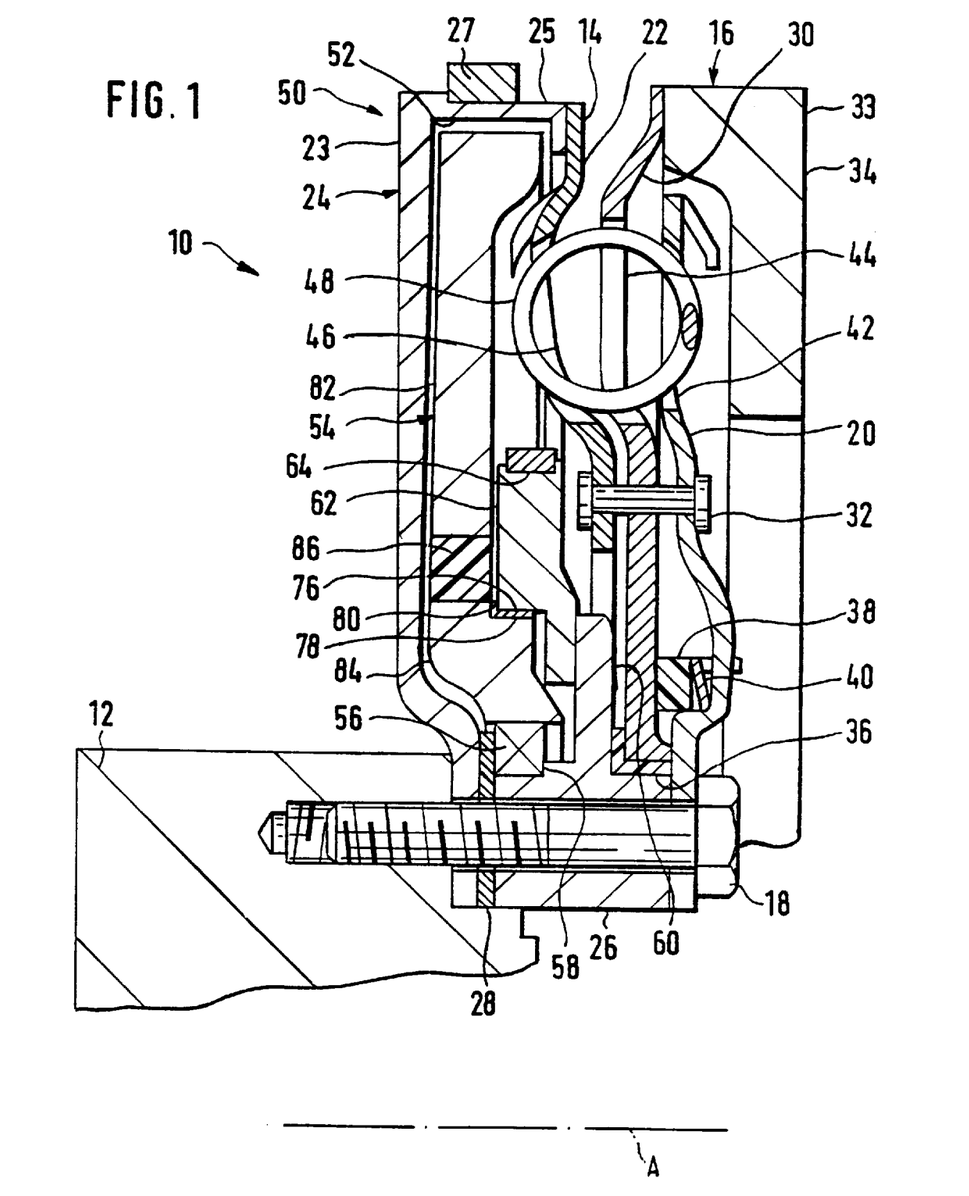
FIG. 1 is a partial longitudinal section through a first embodiment of a rotary vibration damping device according to the invention.

In FIG. 1, a rotary vibration damping device is identified generally by reference number 10. An input part 14 of a torsional vibration damper 16 is attached to a crank shaft 12 by screw bolts 18. The crank shaft 12 can be rotated around an axis A. The input part 14 has a first cover 20, which is attached by the screw bolts 18 directly to the crank shaft 12. The input part also has a second cover 22, which is attached via a disk-like centrifugal mass part 24 and the screw bolts 18 to the crank shaft 12. The second cover 22 is securely connected at its radially inner end section to the first cover 20 by bolts or pins 32. Further, an input disk 26 is attached by means of the screw bolts 18 to the crank shaft 12. A spacing disk 28 is arranged between the input disk 26 and the centrifugal mass part 24. The first cover 20, the second cover 22 (which is securely connected at a radially outer end to the centrifugal mass part 24, e.g., by screws, adhesives or the like), the centrifugal mass part 24 and the input disk 26 are thus connected in rotation-proof fashion to the crank shaft 12 and constitute a first centrifugal mass arrangement 23. A toothed gear 27, which intermeshes, for example, with a starter gearwheel, is arranged on an axially extending outer wall 25 of the first centrifugal mass arrangement 23. The torsional vibration damper 16 also has an output part 30 arranged between the first cover 20 and the second cover 22. In its radially outer region, the output part 30 is connected in rotation-proof fashion to a second centrifugal mass 34. In its radially inner region, the output part 30 is mounted and centered on the input disk 26, with intermediate mounting of a friction force producing arrangement 36. Moreover, a further friction force producing device 38 acts between the first cover 20 and the radially inner region of the output part 30. This further friction force producing device 38 presses against the output part 30 under the bias of a spring element 40, and thus presses the output part 30 against the radially inner friction force producing device 36. In addition or alternatively to this, it is possible to provide a dragged friction device, which does not become active until a certain relative rotational state is attained between the first and the second centrifugal mass arrangements. The output part 30 and the second centrifugal mass 34 constitute a second centrifugal mass arrangement 33. The first cover 20, the second cover 22 and the output part 30 have respective spring windows 42, 44, 46, which are directed toward each other in the circumferential direction, and in which a helical pressure spring 48 is located so that its respective end regions rest on control edges of the spring windows 42, 44, 46. The helical pressure spring 48 can consist, for example, of a plurality of so-called inner springs, which generate the spring force in interaction. For example, it is possible to provide two or three such inner springs in each spring window 42, 44, 46. The helical pressure spring 48 serves to connect the output part 30 and the second centrifugal mass 34 connected thereto to the input part 14 for rotation around the axis A. However, due to the spring elasticity of the helical pressure spring 48, the input part 14 and the output part 30 are movable relative to each other against the spring force of the helical pressure spring 48. Thus, thanks to the helical pressure spring 48, a two-mass flywheel of conventional design is created, which constitutes a torsional vibration damper. Of course, a plurality of such spring windows is or can be arranged along the circumference in the input part 14 and the output part 30, as can a corresponding plurality of the helical pressure springs 48. The second centrifugal mass 34 thereby forms part of the two-mass flywheel 50, to which a clutch housing can be attached and which has a friction surface tor a clutch disk (not shown) that can be compressed between a clutch pressure plate and the two-mass flywheel 50.

The second cover 22 and the first centrifugal mass 24 form a virtually ring-shaped cavity 52, in which a third centrifugal mass 54 is arranged.

The third centrifugal mass 54 is rotatably mounted on a radially inner area on the input disk 26 via a bearing 56. The bearing 56 is held between the spacing disk 28 and a shoulder 58 formed on the input disk 26. The third centrifugal mass 54 is thus rotatable relative to the crank shaft 12.

A plurality of connection elements 62 is distributed in radially movable fashion on a radial circumferential flange 60 of the input disk 26. In addition a radial guidance projection with a preferably swallowtail-shaped cross-sectional profile can be provided for each connection element, for example, on the circumferential flange 60. Each of these radial projections engages into a correspondingly shaped guidance recess, also having a swallowtail-shaped cross-sectional profile, on the respective connection elements. The connection elements 62 are thus run on the circumferential flange 60 so as to be freely movable in the radial direction, but are securely connected to the circumferential flange 60 for common rotation around the axis A.

Figure 3:
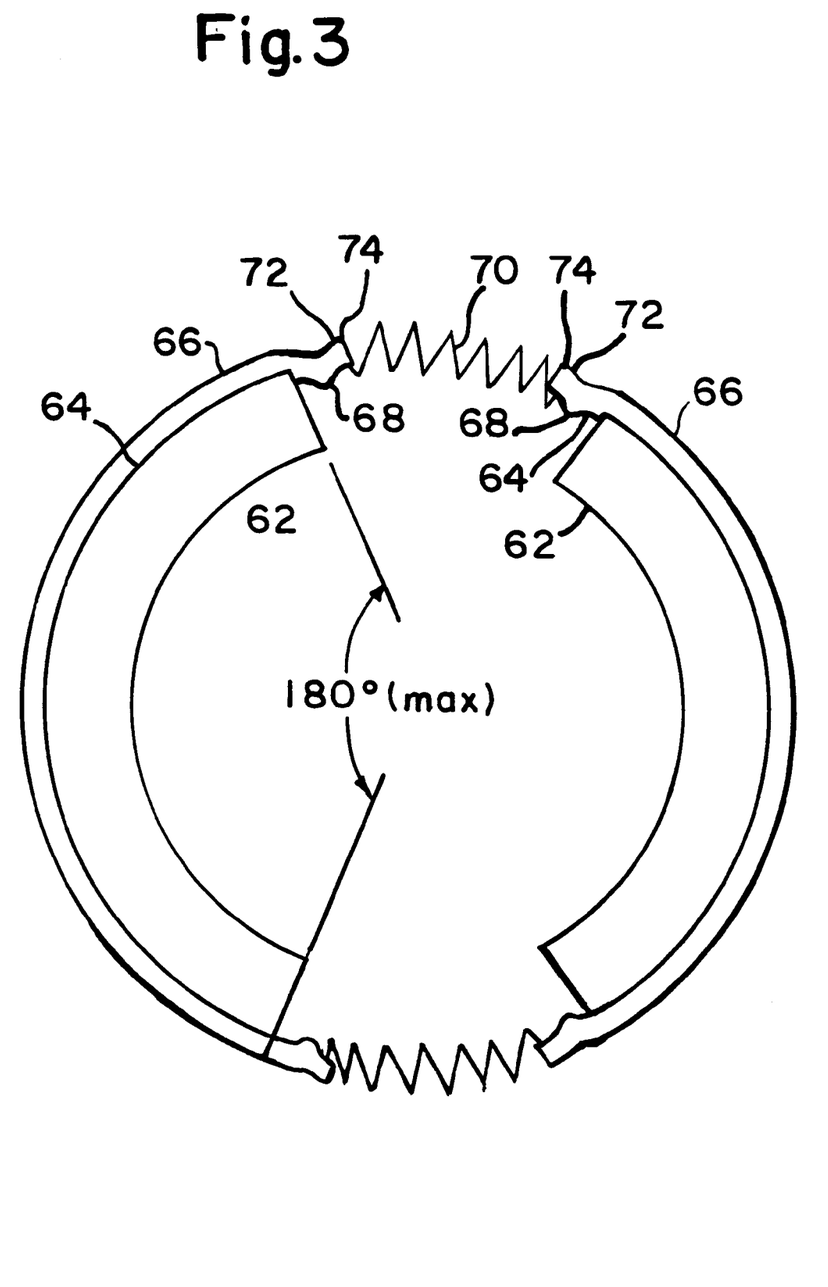
FIG. 3 is a partial side view of two connection elements connected to each other by a tension spring.

The connection elements 62 can be, for example, two ring segment parts with an angular extension of less than 180°, preferably less than 170°. However, it is also possible to use more, e.g., three or four, such connection elements 62. In a radially outer region, the connection elements 62 have a circumferential recess 64 that opens radially outward. The recess 64 on each connection element 62 can accommodate a clamping ring 66 in such a way that the clamping ring 66 is axially fixed relative to the respective connection element 62, but can be moved in the circumferential direction. To limit the circumferential movement between the clamping rings 66 and the connection elements 62, the clamping rings 66 have, at their two end areas, respective inwardly protruding stops 68, which, in the event of a relative movement between a clamping ring 66 and a connection element 62, come to rest on a face of the connection element 62, and thus do not permit further movement. A tension spring 70 is arranged between the end areas of two clamping rings 66, which are located adjacent to each other in the circumferential direction. The tension spring 70 is connected at its two respective ends to the corresponding ends of the directly adjacent clamping rings 66, and produces a tensile force between these clamping rings 66. For example, an opening 72 can be provided in each end of a clamping ring 66, into which opening 72 engages a hook-like end area 74 of the tension spring 70. Because of the tension springs 70 arranged between the respective end areas of all of the clamping rings 66, the circuit arrangement consisting of the tension springs 70 and the clamping rings 66 tends to reduce its circumference as much as possible. As a result, the connection elements 62 are pressed radially inward via the clamping rings 66. The connection elements 62 then come to rest with one connection region 76 on a complementary connection region 78 on the third centrifugal mass 54. The connection region 78 on the third centrifugal mass 54 is formed by a cylindrical outer wall that extends in approximately the axial direction, while the connection region 76 of each connection element 62 is formed by a corresponding cylindrical wall segment. A friction element 80 is provided on at least one of the connection regions 76, 78, preferably the connection region 78 on the third centrifugal mass 54. Due to the spring bias by means of the tension spring 70, a friction surface of the other respective component, preferably the connection elements 62, comes to rest on this friction element. In this way, a frictional force connection is established between the third centrifugal mass 54 and the connection elements 62, and thus between the third centrifugal mass 54 and the input part 14 of the torsional vibration damper 16.

Of course, instead of providing the additional corresponding friction elements and friction surfaces in the connection region 76 of the connection elements, it is possible to provide at least one recess or at least one projection, which engages with a corresponding projection or recess in the connection region 78 of the third centrifugal mass 54, thus establishing a positive-locking connection in the circumferential direction. For example, toothing can be embodied on the respective connection regions.

During operation, when the crank shaft 12 rotates around the rotational axis A, due to the rotation-proof connection, the shaft takes along the torsional vibration damper input part 14, which constitutes the first centrifugal mass arrangement 23 of the two-mass flywheel 50. The second centrifugal mass arrangement 33 of the two-mass flywheel 50, consisting of the torsional vibration damper output part 30 and the second centrifugal mass 34, is also taken along via the helical pressure spring 48. Further, the connection elements 62, which are biased radially inward, ensure that the third centrifugal mass 54, which is held on the first centrifugal mass arrangement 23, is also taken along for rotation around the rotational axis A.

If the speed of the crank shaft 12 is then increased, the centrifugal force acting on the connection elements 62 increases correspondingly. This centrifugal force attempts to move the connection elements 62 radially outward against the spring force of the tension springs 70. The connection elements 62 thus act as centrifugal weights. By suitably selecting the mass of each connection element 62, it is possible to determine the speed at which the bias force exercised by the tension springs 70 becomes insufficient to hold the connection elements 62 in connective engagement with the third centrifugal mass 54 against the action of the centrifugal force. In other words, the rotary drive connection between the first centrifugal mass arrangement 23 and the third centrifugal mass 54 is released when a predetermined speed is exceeded, so that then only the first and second centrifugal mass arrangements 23, 33 of the two-mass flywheel 50 are rotated with the crank shaft 12, while the third centrifugal mass 54 is disconnected from the drive train with respect to rotary drive. Thus, when a predetermined speed is exceeded, a change occurs in the mass moment of inertia of the rotary vibration damping device, which leads to a corresponding change in damping behavior.

It has been found that in a higher speed range, for example, a speed range of 1500 to 2500 revolutions per minute, practically no rotary vibrations occur in the drive train. For this reason, additional rotary vibration damping by means of the third centrifugal mass 54 is no longer needed when such a high speed range is attained. The third centrifugal mass 54 is then disconnected from the drive train, so that the agility of the internal combustion engine (not shown in the drawings) that drives the crank shaft 12 is clearly increased in this speed range, because, when the driver wishes to change speed, the third centrifugal mass 54 no longer must be accelerated or slowed down. This clearly increases the output capacity of the internal combustion engine and, at the same time, reduces fuel consumption.

If the speed is then reduced, there is a danger that rotary vibrations will again be produced, due to the more out-of-round running of the internal combustion engine at low speeds. However, in this event, the centrifugal force acting on the connection elements 62 also decreases, so that the tension springs 70 again press the connection elements 62 radially inward. As a result, the third centrifugal mass 54 is again connected to the drive train, i.e., to the first centrifugal mass arrangement 23, with respect to rotary drive.

As FIG. 1 also shows, the third centrifugal mass 54 consists of two centrifugal mass parts 82, 84, which are connected to each other via an elastic ring 86. Each of the centrifugal mass parts 82, 84 can connected to the elastic ring 86, for example, by adhesive means. The elastic ring 86 thus performs an additional vibration suppression function, because, when the third centrifugal mass 54 is connected to the first centrifugal mass arrangement 23, the rotary vibrations that occur cause deformation of the elastic ring 86. Because this deformation energy is at least partially dissipated as heat, it is not subsequently returned to the drive train, allowing the rotary vibrations that led to the deformation to be further damped.

The third centrifugal mass is connected to the drive train before the helical pressure springs 48 in the drive power flow direction. For this reason, the third centrifugal mass can provide damping in an unreduced manner, especially with respect to rotary vibrations produced by the internal combustion engine. The particular masses of the first centrifugal mass arrangement 23 (which comprises the first cover 22, the first centrifugal mass 24 and the input disk 26), the second centrifugal mass arrangement 33 (which comprises the output part 30 and the second centrifugal mass 34) and the third centrifugal mass 54 can be selected in such a way as to provide optimal vibration damping characteristics for a particular drive system. The weight of the connection elements 62 or the bias force provided by the tension springs 70 can also be adjusted to a particular drive system so that the third centrifugal mass 54 is connected to the drive train in the speed range in which rotary vibrations can be expected to occur in the drive system, and is disconnected from the drive train when this speed range is exceeded or fallen below, so that the output capacity of the engine is then increased, because the third centrifugal mass 54 no longer needs to be accelerated or slowed down.

Figure 2:
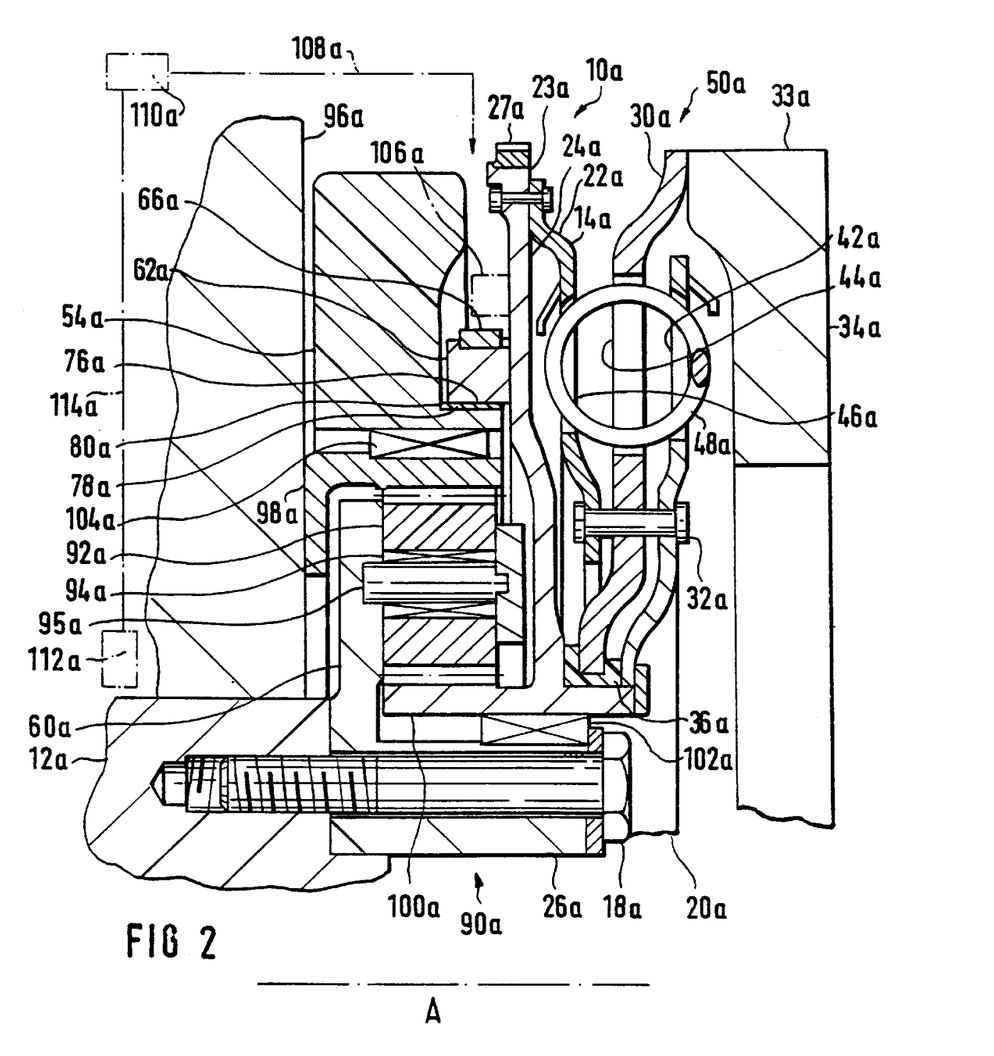
FIG. 2 is a view corresponding to FIG. 1 of a second embodiment of the device according to the invention.

FIG. 2 shows a second embodiment of the rotary vibration damping device according to the invention. Parts that correspond to parts shown in FIGS. 1 and 3 are identified by the same reference numbers plus the suffix "a". The rotary vibration damping device 10a in FIG. 2 is described in detail below only to the extent that it differs from the embodiment in FIG. 1.

In the embodiment in FIG. 2, a planetary gearset 90a is arranged in the drive train between the crank shaft 12a and the first centrifugal mass arrangement 23a, i.e., the torsional vibration damper input part 14a. The input disk 26a, with its circumferential flange 60a, thereby forms a planetary gear carrier, on which a plurality of planetary gears 92a distributed in the circumferential direction are rotatably held via rotary bearings 94a on bolts 95a, which are substantially parallel to the rotational axis A. A ring gear 98a, which intermeshes by means of internal toothing with the planetary gears 92a is attached to a part 96a, for example, an internal combustion engine housing part 96a, which is not rotatable around the rotational axis A. Further, an axially extending cylindrical section 100a is provided on a radially inner area of the first centrifugal mass arrangement 23a. This section 100a forms a sun gear with external toothing and is rotatably mounted via a bearing 102a on the input disk 26a. Upon rotation of the crank shaft 12a, and thus of the input disk 26a, the planetary gears 92a are moved around the rotational axis A by means of the circumferential flange 60a that serves as a planetary gear carrier. The planetary gears 92a, because they intermesh with the ring gear 98a that is attached in rotation-proof fashion, rotate on the planetary gear carrier 60a and transmit this rotation to the cylindrical section 100a (which acts as the sun gear) of the first centrifugal mass arrangement 23a. In other words, the speed ot the crank shaft 12a, translated by the planetary gearset 90a, is transmitted to the first centrifugal mass arrangement 23a and thus to the two-mass flywheel 50a. The parts of the planetary gearset 90a that can rotate with the crank shaft 21a thereby form part of the first centrifugal mass arrangement.

Furthermore, in the embodiment in FIG. 2, the third centrifugal mass 54a can be connected to or disconnected from the first centrifugal mass arrangement 23a by means of the connection elements 62a. For this purpose, the third centrifugal mass 54a is rotatably mounted via a bearing 104a on an external circumferential surface of the ring gear 98a. The process of connection or disconnection by means of the connection elements 62a is the same as described above in reference to FIG. 1.

In the embodiment in FIG. 2, the speed of the entire rotary vibration damping device 10a is thus translated upward by the planetary gearset 90a. This translatory effect increases the mass inertia of the rotating masses, i.e. the first centrifugal mass arrangement 23a, the second centrifugal mass arrangement 33a and the third centrifugal mass 54a, so that an increased damping effect can be obtained with a mass that remains the same. In this embodiment, the third centrifugal mass 54a can again be connected and disconnected depending on speed, so that the same effects are obtained as described above in reference to the first embodiment. The special arrangement of the planetary gearset components allows the greatest possible translatory action to be attained.

Moreover, in the embodiment in FIG. 2, the connection elements 62a do not move radially outward simply because of the centrifugal force that acts upon them. Switching devices 106a are also provided, by means of which the connection elements 62a can be actively switched from their connecting position (connecting the third centrifugal mass 54a to the drive train) to their disconnecting position. Each switching device 106a can consist, for example, of an electromagnetic coil, while a permanent magnet or the like can be provided on each connection element 62a. If an excitation current is then run to the switching devices 106a from a control device 110a via a line 108a (as shown by the dashed line), the permanent magnets arranged on the connection elements 62a will attract each other and, as a result, move the connection elements 62a radially outward against the force of the tension springs.

Furthermore, it is also possible to provide a conventional speed sensor 112a that detects, for example, the speed of the crank shaft 12a or any other part rotatable with the drive train. Depending on the speed value that is sent by the speed sensor 112a to the control device 110a via a line 114a, the control device 110a can activate or deactivate the switching device 106a as a function of speed, resulting in the controlled connection or disconnection of the third centrifugal mass 54a. A movement sensor can also be provided to detect movement of the connection elements in the radial direction. If such movement is detected, this information can be used, additionally or alternatively, to activate the switching devices 106a for the purpose of obtaining a spontaneous disconnection process.

In the control device 110a, a hysteresis loop can be provided, for example, so that when the crank shaft 12a fluctuates in the area of the speed needed to activate the switching process, excessively frequent switching processes are not carried out by the switching devices 106a. Even with this additional movement control of the connection elements 62a, bias into the connecting position is provided by the tension springs. As a result, the respective switching devices 106a need be activated only to move and hold the connection elements 62a in their disconnecting position. Furthermore, when such control of the movement of the connection elements 62a is provided, the connection elements 62a can be constructed smaller in size, with respect to mass, because the essential contribution to movement is then supplied by the switching devices 106a.

Of course, in the embodiment in FIG. 2, the movement of the connection elements 62a between the connecting and disconnecting positions can also be caused by centrifugal force alone, and the switching devices 106a can be omitted. Similarly, it is possible to control the movement of the connection elements as in the embodiment in FIG. 1.

Figure 4:
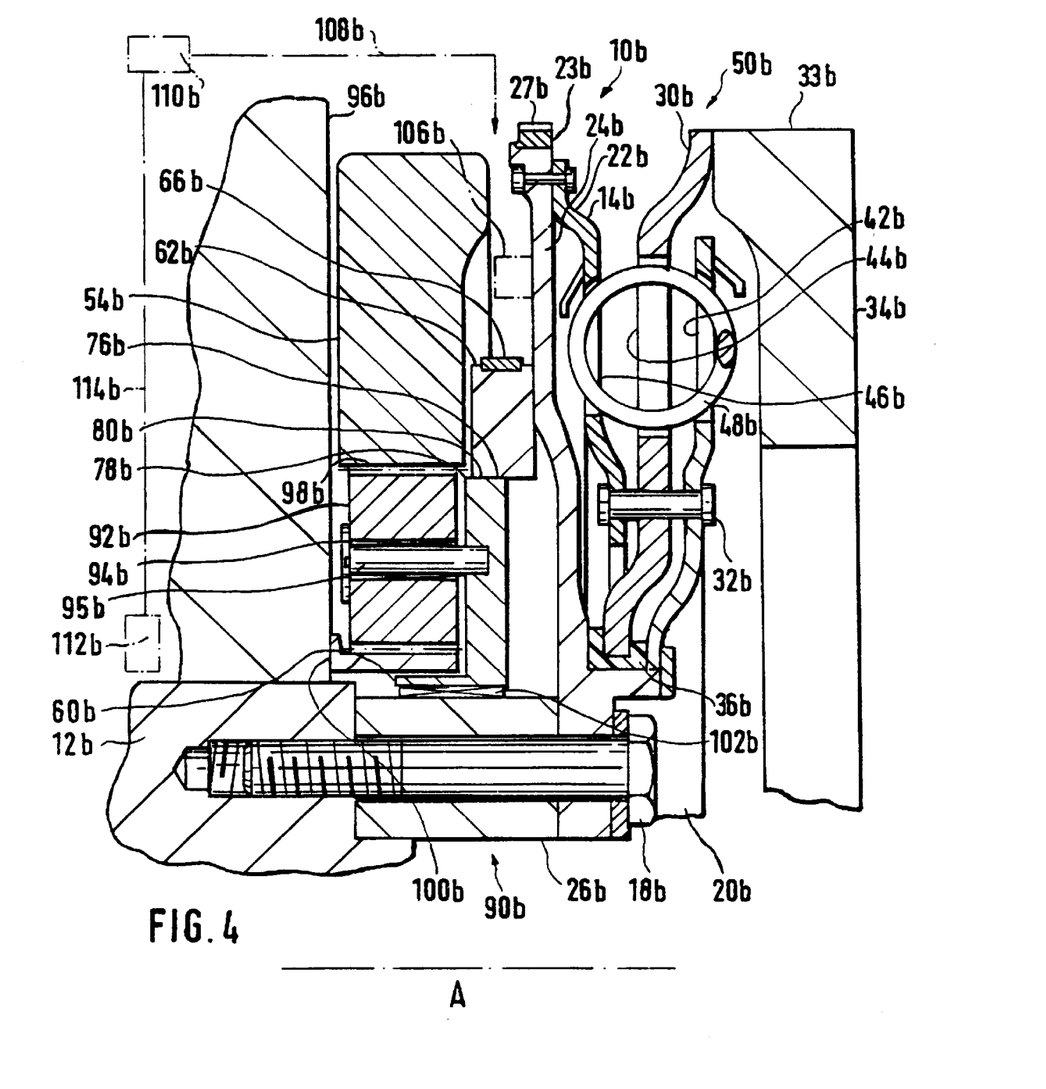
FIG. 4 is a view corresponding to FIG. 2 of a third embodiment of the device according to the invention.

FIG. 4 shows a further embodiment according to the invention, which substantially corresponds to the embodiment in FIG. 2. The follow discussion thus refers only to the differences from the embodiment in FIG. 2. Components that correspond to components in FIGS. 1 and 2 are identified by the same reference numbers plus a "b".

In the embodiment in FIG. 4, the planetary gearset 90b is arranged so as to be located in the power transmission path between the crank shaft 12b and the third centrifugal mass 54b when the third centrifugal mass arrangement 54b is connected to the first centrifugal mass arrangement 23b with respect to rotary drive. The planetary gear carrier 60b is mounted in rotatable fashion on the crank shaft 12b, or on a component 26b connected in rotation-proof fashion to the crank shaft 12b, and carries a plurality of planetary gears 92b, which are distributed in the circumferential direction. A sun gear 100b is secured to a non-rotatable component 96b, and intermeshes radially inside with the planetary gears 92b. The ring gear 98b is embodied on an inner circumferential region of the substantially annular third centrifugal mass 54b, and intermeshes radially outside with the planetary gears 82b. Further, the planetary gear carrier 60b can be connected to and disconnected from the first centrifugal mass arrangement 23b by means of the connection elements 62b, which run in radially movable fashion on the first centrifugal mass arrangement 23b, whereby the friction surface area 78b associated with the third centrifugal mass 54b is formed on the planetary gear carrier 60b.

In such an embodiment, the first centrifugal mass arrangement 23b is connected in its radially inner area to the crank shaft 12b in rotation-proof fashion. In other words, the drive torque of the crank shaft 12b is transmitted to the drive train directly and without transmission by means of a gear mechanism. The planetary gearset 90b serves solely to increase the speed of the third centrifugal mass 54b and can therefore, with respect to its power transmission capacity, be much weaker, and thus lighter, than the planetary gearset in FIG. 2. In addition, in such an embodiment, when the third centrifugal mass 54b is connected to the first centrifugal mass arrangement 23b by connecting the planetary gear carrier 60b (which, together with its planetary gears 92b, comprises part of the third centrifugal mass arrangement), it is possible to increase the speed of the third centrifugal mass 54b relative to the crank shaft 12b with the first centrifugal mass arrangement 23b, with the advantages described above. It is also possible to directly connect the planetary gear carrier 60b to the crank shaft, while bypassing the first centrifugal mass arrangement 23b.

Although the third centrifugal mass is shown in the drawings as being connectable to the first centrifugal mass arrangement substantially as a unit, it is equally possible to divide the third centrifugal mass into multiple centrifugal mass segments, which are rotatable relative to each other and can be connected to each other in series by suitable connection elements. These connection elements can substantially correspond in structure to those shown in the drawings and can be designed, with respect to their activation moment, so as to be activated not simultaneously, but rather in stepped fashion depending on speed, so that individual centrifugal mass segments can be successively disconnected. In this way, a step-type transition between a state of maximum damping mass and a state of minimum damping mass can be achieved.

Furthermore, in the embodiment in FIGS. 2 and 4, it is equally possible to divide the third centrifugal mass into two centrifugal mass parts, and to connect these two parts to each other by an elastic ring, so as to also obtain an additional damping suppression function in this embodiment.

The rotary vibration damping device according to the invention serves to increase the mass inertia moment on the primary side of the two-mass flywheel. As a result, the irregularities in the running of the internal combustion engine are reduced and, in addition, the resonance frequency is lowered. This is important, especially during the starting process, to effectively prevent unwanted rotary vibrations.

It has proved advantageous for the ratio of the mass inertia moment between the primary and secondary sides of the two-mass flywheel, i.e. between the first centrifugal mass arrangement and the third centrifugal mass, on the one hand, and the second centrifugal mass arrangement, on the other, to be in the range of 60:40.

The two-mass flywheel contained in the torque vibration damping device and shown in FIGS. 1, 2 and 4 is of the dry running type. However, it will be apparent to those skilled in the art that this two-mass flywheel can also be designed with lubricant pockets that hold a paste-like lubricant, e.g., lubricating grease, in the area of each critical friction point, especially in the area of the helical pressure springs. The lubricant in such a lubricated embodiment allows an additional hydrodynamic friction and damping effect to be provided, which can help to reduce rotary vibrations arising in the drive train.

Reliable damping of the rotary vibrations arising in the drive train can be provided by means of the rotary vibration damping device according to the invention. One reason for this is that the additional damping mass is arranged before a torsional vibrational damper in the drive power flow direction, so that the rotary vibrations or crank shaft vibrations that are produced, in particular, in a internal combustion engine can be damped in an unreduced manner. Furthermore, the additional damping mass can be disconnected when a predetermined speed is exceeded. This means that a high vibration damping mass is provided in the lower speed range, in which rotary vibrations are highly like to occur, while in the high speed range, in which the occurrence of rotary vibrations is not expected or is expected only to a slight extent, the agility of the internal combustion engine can be increased. As a result, the output behavior of the internal combustion engine is improved and, at the same time, fuel consumption can be reduced. Moreover, when a translation gear is provided to translate the speed of the particular centrifugal masses upward, it is possible for the individual centrifugal masses to be light and smaller in structure, while virtually the same damping effect is obtained as in a device without speed translation. As a result, the entire rotary vibration damping device requires less structural space and thus can be better integrated into a drive train.

The rotary vibration damping device according to the invention has been described above in such a way that, given active connection or disconnection of the connection elements by suitable activation means, a movement state of the connection elements or the speed of the engine, for example, is used to initiate connection or disconnection. It should be noted that it is equally possible to use many other operating states for the purpose of initiating connection or disconnection. For example, a rotary acceleration can be obtained by differentiation from the speed detected by the speed detection means, and this rotary acceleration can be used to define an operating state in which the third centrifugal mass arrangement is to be disconnected. It is also possible to use a machine coolant temperature, that is, it is possible to disconnect the third centrifugal mass arrangement when a certain temperature is reached. In addition, the intention of the vehicle driver to accelerate the vehicle can be identified, for example, by detecting the choke opening degree and the change rate of the choke opening degree, or by detecting the extent to which the gas pedal is activated, etc. Such an intention can be used to define an operating state in which the additional centrifugal mass arrangement is to be disconnected to permit the strongest possible acceleration. If the operating state then leaves a predetermined range, i.e. if the operating state then exceeds the predetermined state in the opposite direction, the third centrifugal mass arrangement is reconnected. To avoid excessively frequent connection and disconnection, switching hysteresis can be provided.

The invention is not limited by the embodiments described above which are presented as examples only but can be modified in various ways within the scope of protection defined by the appended patent claims.

I claim:

1. A rotary vibration damping device for damping rotary vibrations in a drive train through which output torque of an internal combustion engine having a crank shaft is transmitted in a drive power flow direction driving wheels of a motor vehicle, the rotary vibration damping device comprising a first inertial mass arrangement that is connected to the crank shaft of the internal combustion engine for rotation around a rotational axis;

a second inertial mass arrangement;

spring means for connecting the second inertial mass arrangement to the first inertial mass arrangement for common rotation about the rotational axis and for relative rotation with respect to the first inertial mass arrangement;

at least a third inertial mass arrangement that is connected in the drive train before the spring means in the drive power flow direction for rotation about the rotational axis, the at least a third inertial mass arrangement being configured to be disconnectable from the drive train, with respect to rotary drive, when a predetermined operating state is attained, the at least a third inertial mass arrangement includes a first inertial mass part connectable to the first inertial mass arrangement, a second inertial mass part connected to the first inertial mass part, and vibration damping means arranged between the second inertial mass part and the first inertial mass part; and connection means for connecting and disconnecting the third inertial mass arrangement to and from the drive train, the connection means being switchable between a connecting position and a disconnecting position as a function of the operating state, the connection means including a plurality of connection elements that are radially moveable relative to the rotational axis and biased into the connecting position, the connection elements being arranged at a substantially regular distance from each other in a circumferential direction, each connection element comprising a connecting ring segment with a maximum circumferential extension of 180°.

2. A device as defined in claim 1, wherein the at least a third inertial mass arrangement is configured so as to be connectable to the first inertial mass arrangement for rotation around the rotational axis, and disconnectable therefrom.

3. A device as defined in claim 1, wherein the connection elements are arranged to run in a radially movable fashion on the first inertial mass arrangement and have a connection region that is connectively engagable with the at least a third inertial mass arrangement.

4. A device as defined in claim 3, wherein the connection region is a friction surface region configured and arranged to act in the connecting position, on a complementary friction surface region on the third inertial mass arrangement.

5. A device as defined in claim 3, wherein the connection region includes one of a connecting projection region and a connecting recess region that, in the connecting position, engages in positive-locking fashion with a complementary one of a connecting recess and a connecting projection on the third inertial mass arrangement in the circumferential direction.

6. A device as defined in claim 1, wherein each of the connection elements is a centrifugal force weight element which is biased radially inward into the connecting position.

7. A device as defined in claim 1, and further comprising additional spring means for biasing the connection element into the connecting position.

8. A device as defined in claim 1, and further comprising tension spring means, which act respectively in approximately the circumferential direction on the connection elements which are directly adjacent to each other in the circumferential direction, for biasing the connection elements radially inward.

9. A device as defined in claim 1, wherein the ring segments have a maximum circumferential extension of 170°.

10. A device as defined in claim 1, wherein the vibration damping means includes an elastically deformable damping material.

11. A device as defined in claim 10, wherein the vibration damping means is a plastic damping ring.

12. A device as defined in claim 1, wherein the first inertial mass arrangement has a ring-shaped cavity, the third inertial mass arrangement being arranged in the ring-shaped cavity in the first inertial mass arrangement.

13. A rotary vibration damping device for damping rotary vibrations in a drive train through which output torque of an internal combustion engine having a crank shaft is transmitted in a drive power flow direction to driving wheels of a motor vehicle, the rotary vibration damping device comprising:
- a first inertial mass arrangement that is connected to the crank shaft of the internal combustion engine for rotation around a rotational axis;
- a second inertial mass arrangement;
- spring means for connecting the second inertial mass arrangement to the first inertial mass arrangement for common rotation around the rotational axis and for relative rotation with respect to the first inertial mass arrangement;
- at least a third inertial mass arrangement that is connected in the drive train before the spring means in the drive power flow direction for rotation around the rotational axis, the at least a third inertial mass arrangement being configured to be disconnectable from the drive train, with respect to rotary drive, when a predetermined operating state is attained;
- connection means for connecting and disconnecting the third inertial mass arrangement to and from the drive train, the connection means being switchable between a connecting position and a disconnecting position as a function of the operating state, the connection means including connection elements having a radial outer region with a recess that opens radially outward, a damping ring arranged in the recess of each connection element, and additional spring means connected between adjacent ends of adjacent of the clamping rings so as to produce a tensile force between the clamping rings and thereby limit outward radial movement of the connection elements.

14. A device as defined in claim 13, wherein the predetermined operating state comprises at least one of a predetermined speed level, a predetermined relative rotational state between the first and the second inertial mass arrangements, a predetermined speed change state, a predetermined engine coolant temperature, and a predetermined choke opening change rate level.

15. A device as defined in claim 14, wherein the speed level is one of a predetermined speed and a predetermined speed range ol one of the crank shaft, the first inertial mass arrangement, the second inertial mass arrangement, a transmission input shaft and another component rotatable with the drive train.

16. A device as defined in claim 13, and further comprising connection element switching means for controllably moving the connection element between the connecting position and the disconnecting position.

17. A device as defined in claim 16, and further comprising operating state detection means for detecting the operating state and switching means activation means for activating the connection element switching means as a function of the detected operating state.

18. A device as defined in claim 12, wherein the operating state detection means includes at least one of speed detection means, rotary acceleration detection means, connection element movement detection means for detecting a movement state of the connection elements, relative rotational state detection means for detecting a relative rotational state between the first and second inertial mass arrangements, engine coolant temperature detection means, and choke opening change rate detection means.

19. A device as defined in claim 16, wherein the connection element switching means is operative to move the connection element by one of electrostatic and electromagnetic interaction.

20. A device as defined in claim 13, wherein the connection elements are arranged at a substantially regular distance from each other in a circumferential direction.

21. A device as defined in claim 13, and further comprising a speed translation gear arranged in a power transmission path between the crank shaft and at least one of the first inertial mass arrangement and the third inertial mass arrangement so as to translate speed of at least one of the first inertial mass arrangement and the third inertial mass arrangement relative to the crank shaft.

22. A device as defined in claim 21, wherein the speed translation gear includes a planetary gearset.

23. A device as defined in claim 22, wherein the planetary gearset comprises:
- a planetary gear carrier which is connected in rotation-proof fashion to the crank shaft and on which at least one planetary gear is carried so as to be rotatable around an axis substantially parallel to the rotational axis;
- a ring gear that is not rotatable around the rotational axis and intermeshes radially outside with the at least one planetary gear; and
- a sun gear connected in rotation-proof fashion to the first inertial mass arrangement and intermeshes radially inside with the at least one planetary gear.

24. A device as in claim 23, wherein the sun gear is rotatably mounted to one of the crank shaft and a component fixed to the crank shaft.

25. A device as defined in claim 23, wherein the third inertial mass arrangement is rotatably mounted on a radially external circumferential surface of the ring gear.

26. A device as defined in claim 22, wherein the planetary gearset comprises:
- a planetary gear carrier, which is connectable in rotation-proof fashion to the crank shaft and on which at least one planetary gear is carried so as to be rotatable around an axis substantially parallel to the rotational axis;
- a sun gear that is not rotatable around the rotational axis and intermeshes radially inside with the at least one planetary gear; and
- a ring gear connected in rotation-proof fashion to the third inertial mass arrangement and intermeshes radially outside with the at least one planetary gear.

27. A device as defined in claim 26, wherein the ring gear is integral with the third inertial mass arrangement.

* * * * *